United States Patent
Colclough et al.

[11] Patent Number: 5,980,149
[45] Date of Patent: Nov. 9, 1999

[54] SAMPLING ARM COUPLER

[75] Inventors: Stephen J. Colclough, Baltimore; Louie J. Lipp, Fallston, both of Md.

[73] Assignee: The United States of America as represented by the Secretary of the Army, Washington, D.C.

[21] Appl. No.: 08/969,535

[22] Filed: Sep. 12, 1997

[51] Int. Cl.[6] ............................................... F16D 1/00
[52] U.S. Cl. .......................... 403/312; 411/419; 403/309
[58] Field of Search ................................ 403/157, 158, 403/300, 305, 306, 309, 310, 312, 315, 319, 314, 316, 323, 324, 354, 388; 29/525.11, 525.01; 411/393, 416, 419, 493

[56] References Cited

U.S. PATENT DOCUMENTS

| | | | |
|---|---|---|---|
| 1,967,145 | 7/1934 | Fisher | 411/417 |
| 2,821,419 | 1/1958 | Walton | 403/319 |
| 3,600,010 | 8/1971 | Downs | 285/96 |
| 4,091,523 | 5/1978 | Riecke | 29/525.11 |
| 4,103,378 | 8/1978 | Granados | 7/138 |

*Primary Examiner*—S. Thomas Hughes
*Assistant Examiner*—Steven A Blount
*Attorney, Agent, or Firm*—Ulysses John Biffoni; Edward L. Stolarun

[57] ABSTRACT

A sampling arm coupler device comprises a coupler comprising a rectangular structure or bar, having a cylindrically hollow bore therethrough. The bar has internal threading along the hollowv bore, and internally threaded holes through opposite sides of the bar perpendicular to the hollow bore. The holes are aligned along the bar so as to permit passage of a bolt therethrough. Additionally, the sampling arm coupler device has a lever arm structure having one insert end comprising a half cylinder portion with external threading and a flat longitudinal sure opposite the external threading. The external threading of the half cylinder is capable of mating with the internal threading of the bore whereby the half cylinder portion and the flat longitudinal surface portion inserts and screws into one end of the bar, wherein the flat longitudinal surface portion is positioned as to allow at least one bolt to be inserted through the bar holes perpendicular to the bore along the flat longitudinal surface portion. This rotationally locks the lever arm structure in the bar. The sampling arm coupler disclosed may be installed by hand.

19 Claims, 2 Drawing Sheets

SAMPLING ARM COUPLER

GOVERNMENT INTEREST

The invention described herein may be manufactured, licensed, and used by or for the U.S. Government.

BACKGROUND OF THE INVENTION

1. Field of the Invention

The present invention relates to a sampling arm coupler. More particularly, the sampling arm coupler of the present invention is designed to attach a sampling arm to a lever arm, preferably on a vehicle, to facilitate collection of environmental samples. The sampling arm coupler has improved operational performance, maintenance and repair in cross-country terrain environments.

2. Description of the Related Art

Sampling arm assemblies have been used in military and civilian operations to test the environmental quality of a possibly contaminated area. The use of these assemblies allows area samples to be collected, retained and analyzed in a continuous operation over a large area. Samples from areas of possible nuclear, biological or chemical, commonly referred to as NBC, contamination may be gathered for testing for NBC agents. The assemblies obtain samples outside of a protective environment, such as a vehicle, with minimal exposure of personnel gathering the samples to the possible contamination. As this contamination may occur accidentally or purposely, samples need to be quickly and reliably collected over various geographical areas, including cross-country terrain.

Sampling arm assemblies have a lever arm which is joined to a sampling arm by a sampling arm coupler. The sampling arm coupler needs to provide stiff support to the sampling arm, and yet be flexible to withstand cross-country terrain operations. The sampling arm coupler also should be replaceable, separate and apart from the sampling arm and lever arm, to facilitate maintenance and repair.

Typically, the sampling arm coupler is part of an environmental sampling system which is attached to the rear end of a vehicle. As part of this sampling system, a lever arm is attached to a rotating servo motor on the vehicle. The lever arm is solid and approximately 18 inches long. Connected on the other end of the lever arm is a sampling arm, which is attached to the lever arm by the sampling arm coupler. The sampling arm is a solid flat piece approximately 2 feet long. Generally, the sampling arm has a wheel mechanism for carrying the sampling arm along the ground, while the sampling arm collects samples. Once the sampling arm collects a sample, the rotating servo motor lifts the lever arm and attached sampling arm up to a sensor on the vehicle. The sensor analyzes the collected sample for contamination. Once analyzed, the lever arm and attached sampling arm are lowered by the rotating servo motor to collect additional samples. Commonly, a sampling system has two or more separate lever arms on the back of the vehicle. This allows constant sampling, as one arm is positioned alongside the sensor, the other arm is collecting samples. Multiple arms also provide redundancy to the sampling system in case one arm is damaged.

The sampling arm coupler provides several functions. The coupler needs to ensure that the sampling arm does not detach from the lever arm. Additionally, the coupler needs to be designed and constructed to provide a strong and flexible attachment between the lever arm and sampling arm. Furthermore, the coupler needs to reliably place the sampling arm, once it is lifted, close to the sensor for proper analysis of the collected samples. This is preferably within a 10° margin of error for misalignment. Alignment is also important to ensure that the two sampling arms do not crossover, thereby fouling the entire system. This is especially important because operational repair may expose operators to possible NBC contamination.

The reliability of testing an environmental sample is directly related to the quality of obtaining that sample. Fast response times are needed to obtain samples for testing which are analyzed quickly enough for preventive measures to be instituted. Rapidly moving a sampling system through a possibly contaminated area is especially useful to aid military operations. These military operations include personnel evacuations of non-combatants and medical assistance for populations exposed to NBC agents. In large area military operations, the sampling system is commonly moved to fully assess the size and location of a contaminated area. As the location of NBC contamination is usually uncertain, detection over cross-country terrain is an important capability.

Cross-country operations require sampling arm systems to function properly away from primary and secondary roads in cross-country terrain. Traveling across the cross-country terrain, the sampling arm system is continuously subjected to forces which may damage or break the sampling arm. As such, the system must withstand frequent deflections on rocks, or entanglement in vegetation as the vehicle travels over the cross-country terrain. Accordingly, the system needs flexibility to endure the repeated deflections, and structural resilience to maintain the proper structure to function properly.

When sampling arm systems are used in military operations, they must conform to military maintenance doctrines which ensure unified and reliable maintenance practices throughout the military. Strict military maintenance policy forbids certain practices, for example, soldiers are not permitted to use torque wrenches. Frequent changing of the sampling arm may be desired, however, in remote and dangerous environments. Commonly, however, couplers require a variety of bolts, machine screws, washer and nuts, tightened to a torque specification. Previously known sampling arm couplers may require up to fifteen bolts, washers and nuts, in the sampling arm assemblies. This complexity of previously known sampling arm couplers is problematical for maintenance personnel who have decreased manual dexterity when wearing NBC protective gear or in other difficult and adverse environmental conditions, such as snow, sand or loose dirt.

In view of the foregoing, improvements in sampling arm couplers have been desired. In addition to improved durability in cross-country terrain operations, it has been desired to provide sampling arm couplers which are easier to maintain and simpler to repair.

The present invention addresses these needs.

SUMMARY OF THE INVENTION

In view of the foregoing, it is therefore an object of the present invention to provide a sampling arm coupler useful in cross-country terrain operations.

It is further an object of the present invention to provide a sampling arm coupler which is simple to replace and reliably maintains attachment of the lever arm to the sampling arm.

Another object of the present invention is to provide a sampling arm coupler which may be reliably installed by hand.

Another object of the present invention is to provide a sampling arm coupler that maintains an aligned connection between the lever arm and sampling arm.

Still another object of the present invention is to provide a sampling arm coupler having a generally rectangular shape and which is resilient in rough terrain.

These and other objects are achieved by the present invention which includes a sampling arm coupler device, comprising a coupler comprising a rectangular structure or bar, having a cylindrically hollow bore therethrough, said bar having internal threading along said hollow bore, said bar also having internally threaded holes through opposite sides of said bar perpendicular to said hollow bore, wherein the holes are aligned along said bar so as to permit passage of a bolt therethrough. Additionally, the present invention includes a lever arm structure having one insert end comprising a half cylinder portion with external threading, and said threaded half cylinder also having a flat longitudinal surface opposite the external threading, said external threading of said half cylinder being capable of mating with said internal threading of said bore whereby said half cylinder portion and said flat longitudinal surface portion inserts and screws into one end of said bar, wherein said flat longitudinal surface portion is positioned as to allow at least one bolt to be inserted through said bar holes perpendicular to said bore along the flat longitudinal surface portion so as to rotationally lock said lever arm structure in said bar; and, at least one bolt for insertion into said bar holes.

The present invention further includes a method for attaching a sampling arm coupler, comprising providing the previously claimed device, screwing said bar onto said lever arm structure and inserting said bolt through said holes to rotationally lock said bar to said lever arm structure.

DETAILED DESCRIPTION OF THE PREFERRED EMBODIMENT

The present invention is a sampling arm coupler device. The device permits a reliable and durable connection between a sampling arm and lever arm for cross-country NBC sampling operations. The sampling arm coupler also provides reduced need for the maintenance and repair of the sampling arm. The sampling arm coupler has a minimal number of parts, provides improved alignment and ability to maintain alignment, and provides a simplified replacement and/or repair, especially in an NBC environment.

Figure 1:
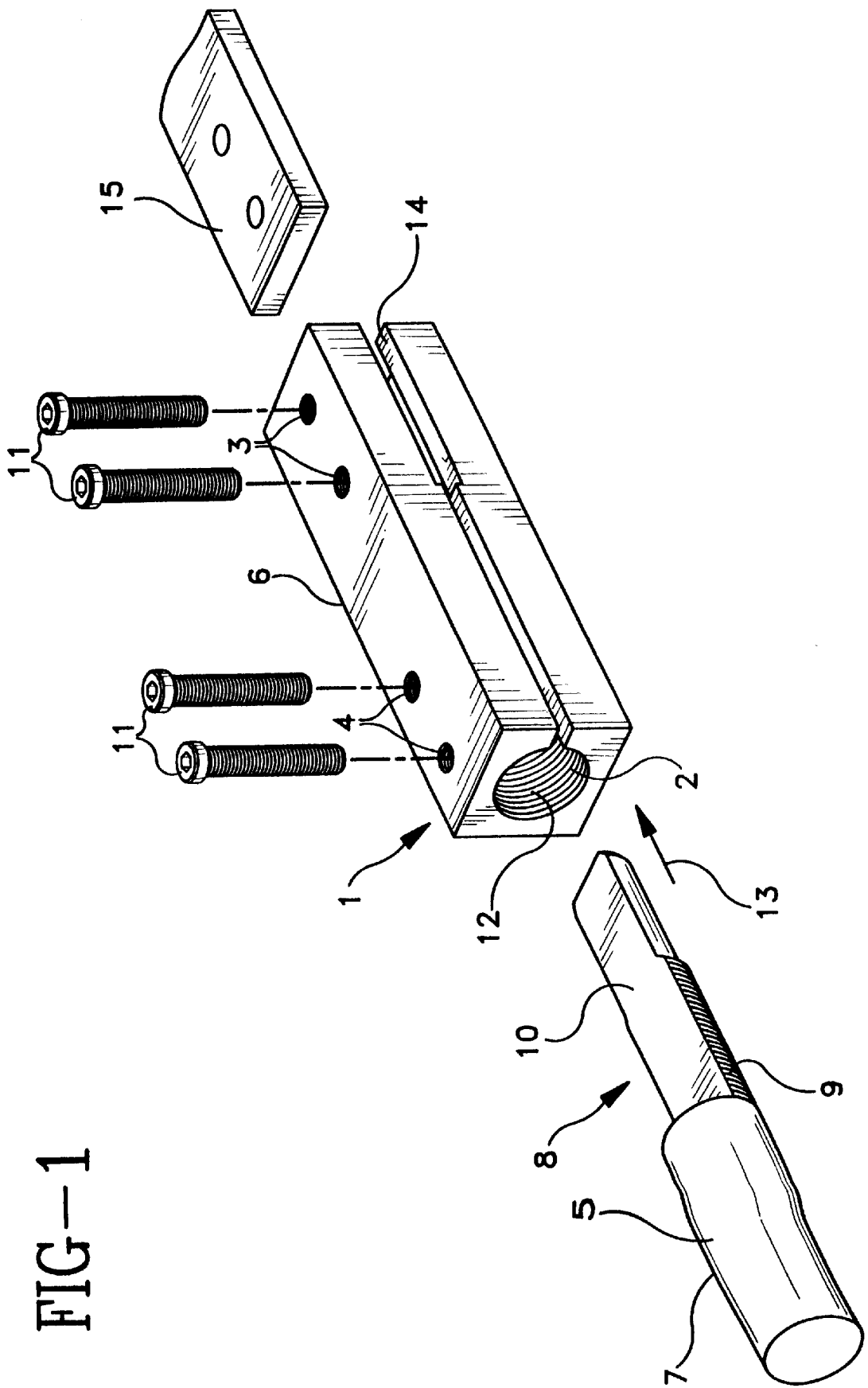
FIG. 1 illustrates a perspective view of a sampling arm coupler for the present invention.
Figure 2:
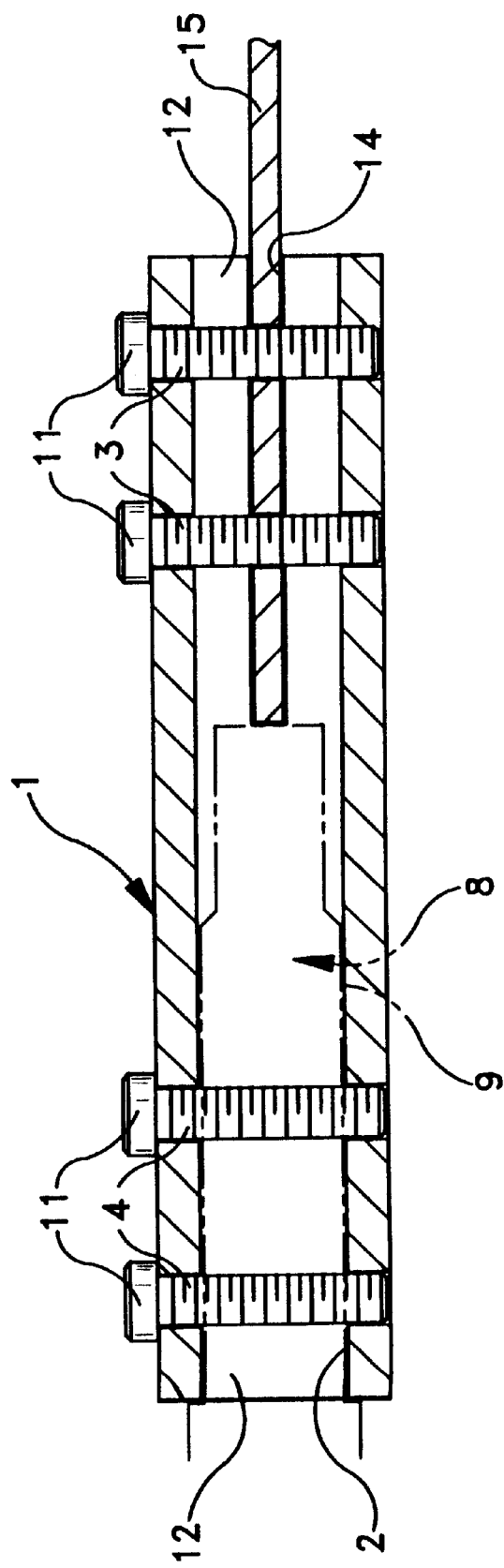
FIG. 2 illustrates cross-sectional side view of a sampling arm coupler for the present invention.

FIG. 1 shows the preferred embodiment of the present invention. FIG. 1 illustrates a perspective view of the sampling arm coupler 1. FIG. 1 further illustrates a insert portion 8 of a lever arm 5 and sampling arm 15. Additionally in a second view of the coupler 1, FIG. 2 shows a cross-sectional side view of the coupler 1. These two figures are described below.

In FIG. 1, the coupler 1 has edges 6 on the outer surface, preferably an outer rectangular shape, and is approximately six inches in length. Internally through the length of the coupler 1, the coupler 1 forms a passage 12 having a round diameter. The internal passage 12 contains internal threading 2 which is configured to receive a threaded body. The outer rectangular shape of the coupler 1 is preferably 25 millimeters across the side and top, with the internal passage 12 having a major diameter which is preferably 19 millimeters. The internal threading 2 of the coupler 1 preferably having a minor diameter of 16 millimeters threads×8 threads per inch.

As seen in FIGS. 1 and 2, the coupler 1 has four holes located along one side of the coupler 1. These four holes form two sets of two holes 3 and 4 which correspond to two sets of two holes (not shown) located along the opposite side of the coupler 1. The holes 3 and 4 are configured and aligned to allow the insertion of a bolt to pass through one of the holes on one side of the coupler 1, and pass through to the corresponding hole on the opposite side. Two of the holes 3 are positioned at a mid-point on the side of the coupler 1, and preferably located individually at 10 mm and 20 mm from one end of the coupler 1. The other two holes 4 are positioned three-fourths down the side of the coupler 1, and preferably located individually at 10 mm and 20 mm from the second end of the coupler 1.

As further seen in FIG. 1, a lever arm 5 has a insert portion 8 and vehicle end 7 which is preferably attached to a rotor servo motor of a vehicle. The insert portion 8 has a smaller diameter than rest of the lever arm 5, and along one side of the insert portion 8, the insert portion 8 is milled to form a half cylinder with a flat longitudinal surface 10 on the insert portion 8. This longitudinal surface 10 is located at approximately five-eights distance across the diameter of the insert portion 8. The outer surface of the insert portion 8 contains threading 9 which is configured to mate with the threading of the internal threading 2 of the coupler 1, preferably having 16 millimeter diameter threads×8 threads per inch.

In connecting the sampling arm coupler 1 to the lever arm 5, the lever arm 5 and coupler 1 are joined as indicated by the arrow 13, and the internal threading 2 of the coupler I is screwed onto the outer surface threading 9 of the insert portion 8 of the lever arm 5. The end of the coupler 1 which contains the two holes 4 which are three-fourths distance down the side of the coupler 1 is placed closest to the lever arm 5. The rectangular shape of the coupler 1 allows the coupler 1 to be screwed on and tightened onto the lever arm 5 by hand. Once screwed onto the lever arm 5, the coupler 1 is rotationally turned to permit the longitudinal surface 10 to lie flush below the two holes 4 in the coupler 1. The half cylinder of the insert portion 8 may occupy approximately one half of the, hollow passage of the coupler 1, but may also occupy greater than or less than one-half of the hollow passage. Two ribbed flange bolts 11 are preferably inserted through the holes 4 to lock the coupler 1 onto the insert portion 8. The two of the bolts 11 are threaded through two holes 4, and across the flat filled surface of the insert portion 8 to prevent the coupler 1 from turning in relation to the lever arm 5. The bolts 11 are preferably self-locking and do not require nuts and washers for securing the bolts in place. The lower section of the holes 4 have internal threading which allows the bolts 11 to additionally squeeze the coupler 1 onto the insert section 8. However, there is no need to tighten the threading between the coupler 1 and insert portion 8 to frictionally lock the coupler 1 in place. This allows tightening by hand without the need for extra tools, and the self-locking bolts 11 also do not require additional tools to secure the coupler 1 in place. Although multiple bolts are used, only one bolt is required in one of the holes 4 to hold the coupler 1 securely onto the lever arm 5, and permit proper functioning.

As the bolts 11 are placed through the holes 4 in the coupler 1, they pass along the top of the flat longitudinal surface 10, and through to the corresponding holes 4 on the opposite side of the coupler 1. These bolts 11 prevent the coupler 1 from rotational movement in relation to the insert portion 8, while concurrently, the interaction of the internal threading 2 of the coupler 1 and the external threading 9 of the insert portion 8 prevent the coupler 1 from moving longitudinally in relation to the insert portion 8.

Also shown in FIGS. 1 and 2, the two holes 3 at the end of the coupler 1 furthest away from the lever arm 5 are used to secure a sampling arm 15 to the coupler 1 using bolts 11. A sampling arm 15 is inserted into the coupler 1 along a slot 14 and locked in place with the bolts 11 inserted through the holes 3 of the coupler 1, passing through two holes on the sampling arm 15, and further passing out the opposite end of the coupler 1. As the bolts 11 are fastened onto the coupler 1, the coupler 1 is squeezed onto the sampling arm 15, thereby tightening the coupler 1 onto the sampling arm 15. Within the holes 3, internal threading along the lower section allows the tightening by turning the bolts 3 with a single wrench. The sampling arm 15 may be adjusted longitudinally with the coupler 1 to permit proper alignment with the sensor on the vehicle.

The combination of the bolts 11 preventing rotational movement of the coupler 1 and the interaction of the external threading 9 and internal threading 2 preventing longitudinal movement ensures that the sampling arm 15 does not detach from the lever arm 5. Additionally, the connection between the coupler 1 and the insert portion 8 provides a strong and flexible attachment. The coupler 1 ensures less than a 10° margin of error for misalignment, allowing for proper sensor alignment and eliminating sampling arm crossover. Preferably, the coupler is constructed of such materials which allow the coupler to be resilient.

While there have been described what are presently believed to be the preferred embodiments of the invention, those skilled in the art will realize that changes and modifications may be made thereto without departing from the spirit of the invention. It is intended that the claims attached hereto include all such changes and modifications that fall within the true scope of the invention.

What is claimed is:

1. A sampling arm coupler device comprising:
   a coupler comprising a bar having a cylindrically hollow bore therethrough said bar having internal threading along said hollow bore; said bar also having internally threaded holes through opposite sides of said bar substantially perpendicular to said hollow bore, wherein the holes are aligned along said bar so as to have a common central axis to allow passage of a bolt therethrough;
   a lever arm structure having one insert end comprising a substantially half cylinder portion with external threading, and said threaded substantially half cylinder portion also having a flat longitudinal surface opposite the external threading, said external threading of said substantially half cylinder portion being capable of mating with said internal threading of said bore whereby said substantially half cylinder portion having said flat longitudinal surface portion inserts and screws into one end of said bar, wherein said flat longitudinal surface portion is positioned substantially parallel to the central axis of said holes so as to allow at least one bolt to be inserted through said holes substantially perpendicular to and completely through said hollow bore along and substantially parallel to the flat longitudinal surface portion so as to rotationally lock said lever arm structure in said bar; and
   at least one bolt for insertion into said bar holes.

2. The device of claim 1, in combination with a sampling arm attached to said coupler at an end opposite said lever arm structure.

3. The device of claim 2, wherein said sampling arm is attached to said coupler in a slot in said bar and fastened by at least one bolt.

4. The device of claim 2, wherein said coupler connects the lever arm structure and the sampling arm at less than a 10° angular deviation between said lever arm structure and said sampling arm.

5. The device of claim 2, wherein said coupler provides a flexible connection between said lever arm structure and said sampling arm.

6. The device of claim 2, wherein said at least one bolt rotationally locks said coupler to said lever arm structure by crossing along said flat longitudinal portion.

7. The device of claim 2, wherein said flat section is positioned at about a longitudinal axis of said coupler.

8. The device of claim 2, wherein said half cylinder occupies greater than one-half of said hollow bore of the coupler.

9. The device of claim 2, wherein said half cylinder occupies less than one half of the hollow bore of the coupler.

10. The device of claim 2, wherein said coupler is resilient.

11. The device of claim 2, comprising a plurality of internally threaded holes through opposite sides of said bar and a bolt in each of the internally threaded holes for locking said coupler onto said sampling arm.

12. The device of claim 11, comprising two bolts inserted into two internally threaded bar holes for locking said coupler onto said sampling arm.

13. The device of claim 12, wherein said bolts are self-locking.

14. The device of claim 2, wherein said coupler can be threaded onto said lever arm structure by hand.

15. The device of claim 1 wherein said coupler has a rectangular configuration and is approximately six inches long.

16. A coupler assembly comprising:
   A coupler;
   means defining a cylindrical hollow bore having internal screw threading extending at least part way through said coupler;
   means defining at least one cylindrical hole extending completely through said coupler and being substantially perpendicular to and passing through said cylindrical hollow bore and having internal screw threading extending at least part way through said coupler;
   a female connector having an insert end, said insert end comprising a substantially half cylinder portion having external screw threading and having a flat longitudinal surface opposite the external threading, said insert end being rotationally screwable into the cylindrical hollow bore of said coupler, with said external threading of said substantially half cylinder portion being capable of mating with said internal threading of said cylindrical hollow bore; and
   bolt means having external threading thereon and being insertable through said cylindrical hole and completely through said hollow bore, and threadably engageable with said cylindrical hole along and substantially parallel to said flat longitudinal surface to restrict rotational movement of said female connector relative to said coupler to thereby retain the coupling connection therebetween.

17. The coupler assembly of claim 16 wherein:

the coupler is a bar having a pair of opposed, parallel surfaces through which said cylindrical holes extend; and said cylindrical holes are offset from the central axis of said cylindrical hollow bore.

18. The coupler assembly of claim 17 wherein:

said coupler includes means defining a slot in an end thereof for reception of a planar sampling arm, and bolt means for retaining said sampling arm in said slot.

19. The coupler assembly of claim 16 wherein:

said coupler includes means defining a longitudinal slot extending the length thereof for also enabling a compression retention of said female connector by said coupler.

* * * * *